Patented Aug. 5, 1941

2,251,813

UNITED STATES PATENT OFFICE 2,251,813

AZO DYE

Byron L. West, Plainfield, and Dale R. Eberhart, Middlesex, N. J., assignors, by mesne assignments, to American Cyanamid Company, New York, N. Y., a corporation of Maine No Drawing. Application May 23, 1939, Serial No. 275,152

5 Claims. (Cl. 260—152)

This invention relates to azo dyes, and more-particularly to acid wool azo dyestuffs and their preparations.

According to the present invention, we have found that azo dyes having the following general formula:

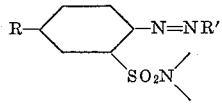

in which R is a nitro, amino, acylamino or aryl azo radical, R' is the radical of an aromatic coupling component, and

is part of a heterocyclic ring, possess excellent properties.

While the invention in its broader aspect covers dyes in which R' is the radical of any aromatic coupling component, we prefer those in which R' contains a solubilizing group such as a sulfonic acid group. These preferred acid azo dyestuffs are particularly useful in the dyeing of wool, but it should be understood that the present invention is not limited to the preferred embodiments.

The dyestuffs of the present invention may be prepared by diazotizing a 4-nitroaniline-2-sulfonamide described in our copending application, Serial No. 275,153, filed May 23, 1939, coupling the resulting diazo compound with a suitable coupling component, and reducing the nitro group. If desired, the amino group so obtained may then be acylated or it may be diazotized and coupled with an aromatic coupling component.

If a monoazo dye is desired, it is possible to start with a 4-acylaminoaniline-2-sulfonamide, diazotize it, and then couple on a suitable coupling component.

Sulfonamides having the following general formula:

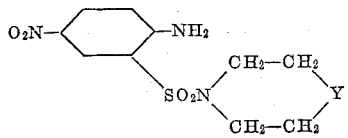

in which Y is O or S and which are derivatives of morpholine or thiomorpholine respectively, are the preferred starting materials of the present invention. However, it should be understood that the invention is in no sense limited to these preferred embodiments and in its broader aspects also includes sulfonamide derivatives of mono-alkylpiperazines.

Various coupling components are suitable for use in the present invention. Examples of coupling components useful for the preparation of acid wool dyestuffs are the Cleve acids, aminonaphthol sulfonic acids such as 2-amino-8-naphthol-6-sulfonic acid (Gamma acid), 2-amino-5-hydroxynaphthalene-7-sulfonic acid (J acid), 1-hydroxy-8-aminonaphthalene-3,6-disulfonic acid (H acid). Other typical coupling components are ice color coupling components such as arylides of 2-hydroxy-3-naphthoic acid or acetoacetic acid, pyrazolones, aminoazo compounds, mononuclear amines, and the like.

The monoazo and disazo dyes prepared according to a preferred embodiment of the present invention where R is acylamino and R' is a sulfonic acid of the naphthalene series dye animal fibers, and particularly wool, in red to violet shades. They dye levelly and possess excellent fastness to light; hence, they are particularly useful in the dyeing of carpet materials.

The invention will be described in greater detail in conjunction with the following specific examples which are only illustrations and not intended to limit the invention to the specific details therein set forth. The parts are by weight.

EXAMPLE 1

*Preparation of intermediate*

256 parts of 4-nitrochlorobenzene-2-sulfon chloride are added to 450 parts of water at room temperature, followed by the addition of 90 parts of morpholine. A 20% sodium hydroxide solution is added with agitation until the pH of the mixture is between 9 and 11. After stirring for 10 minutes, the mixture is heated to 90° C. during about 1 hour. The pH of the reaction is kept between 9 and 11 by the addition of sodium hydroxide solution. Between the temperatures of 72° and 75° C. heating is stopped and a little ice added to keep the temperature from rising too rapidly if the reaction becomes too vigorous.

About 40 parts of sodium hydroxide solution are required. When the reaction is complete, the batch is cooled to 70° C., filtered, and washed until free from alkali.

The 4-nitrochlorobenzene-2-sulfonmorpholide is charged into a suitable autoclave along with 900 parts of water and 255 parts of 29.9% ammonium hydroxide. The batch is then heated to 100° C. in about 1 hour, then to 130° C. in an additional 30 minutes, and held at 130° C. for 10 hours. The maximum pressure developed is about 60 pounds. After cooling to 60°–75° C., the autoclave is discharged and the batch is filtered, washed until free from alkali, and dried in air at 70°–80° C.

Diazotization 287 parts of the 4-nitroaniline-2-sulfonmorpholide are thoroughly mixed with 13 parts of glacial acetic acid and then sprinkled into nitrosyl sulfuric acid from 1870 parts of 93% sulfuric acid and 69 parts of sodium nitrite during 30 minutes, holding the temperature between 30° and 35° C. The mixture is stirred for about 70 minutes at this temperature and then drowned in 5600 parts of water and 3350 parts of ice. This is stirred for 10 minutes, and the diazo compound filtered.

Coupling

To approximately two-thirds of the filtered diazo compound is added over a period of 5–10 minutes a solution of Gamma acid (2-amino-8-napthol-6-sulfonic acid) made up from 196 parts of Gamma acid in 2000 parts of water, 32 parts of sodium hydroxide and sufficient acetic acid to make the solution permanently acid to litmus. The remainder of the diazo compound is added as fast as filtered. The dye is filtered after stirring for about 2 hours.

Reduction

The nitro dye from the 287 parts of 4-nitroaniline-2-sulfonmorpholide is suspended in water, heated to 45° C., and brought to a pH of 7.5 to 8.5 by the addition of approximately 172 parts of sodium hydroxide. Then a solution containing 128 parts of sodium sulfhydrate is added. The temperature rises to about 50° C. and after stirring for 30 minutes, the dye is salted out and filtered.

Acetylation

The reduced dye from 287 parts of 4-nitroaniline-2-sulfonmorpholide is added to sufficient water to just dissolve it at 50° C., then it is heated to 55° C. for 5 minutes, made slightly acid (pH about 6) with acetic acid, iced to 25° C., and 128 parts of acetic anhydride added quickly. After stirring for 30 minutes, the dye is heated to 60° C., salted out with 1050 parts of salt and filtered. The product is dried in air at 60° C. to give about 400 parts of a dark red powder which dyes wool bright red shades of excellent fastness to light.

The formula of the dyestuff obtained is:

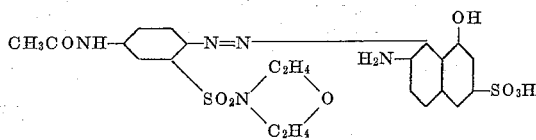

EXAMPLE 2

287 parts of 4-nitroaniline-2-sulfonmorpholide is diazotized as in Example 1, coupled to 272 parts of H acid (monosodium salt) which has been acidified with 116 parts of 36% hydrochloric acid. After stirring for 16 hours, the dye is salted, filtered and re-suspended in 10,000 parts of water. Sodium hydroxide is added until the dye is slightly alkaline, then 104 parts of sodium carbonate is added, the mixture is iced to 0° C., and the diazo compound from 74.4 parts aniline, 55.2 parts of sodium nitrite and 66 parts of hydrochloric acid is added. After coupling is complete, the dye is isolated in the usual way by salting and dyes animal fibers a green shade of blue.

The formula of the dyestuff is as follows:

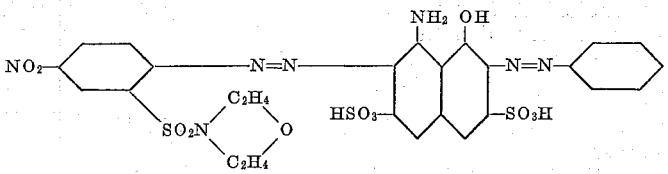

EXAMPLE 3

The dye of Example 2 is further treated by reduction with sodium sulfhydrate, followed by acetylation in the usual manner to give a product that dyes animal fibers green shades of blue, redder than the product of the preceding example.

The formula of the dyestuff obtained is:

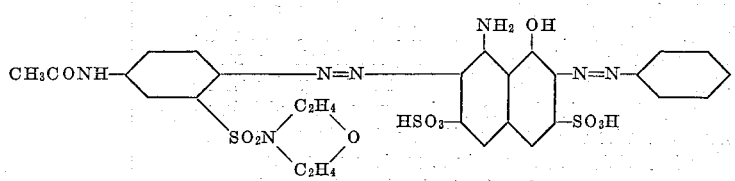

EXAMPLE 4

287 parts of 4-nitroaniline-2-sulfonmorpholide is diazotized as in Example 1 and coupled to 192 parts of J acid in acid medium at 5°–10° C. The precipitated dye is filtered without salting, suspended in 16,000 parts of water, neutralized with sodium hydroxide, 104 parts of sodium carbonate added, and iced to 0° C. Diazobenzene prepared in the usual manner from 74.4 parts aniline, 55.2 parts sodium nitrite and 66 parts hydrochloric acid is added until the diazo test persists at least 30 minutes. The dye is filtered without salting to give a product dyeing animal fibers brown-red shades.

The formula of the dyestuff obtained is:

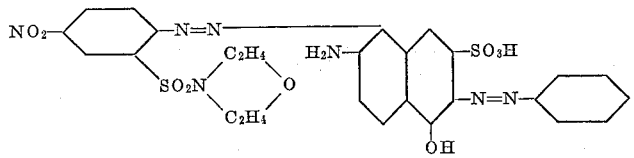

EXAMPLE 5

The dye of Example 4 is further treated by reduction with sulfhydrate, followed by acetylation in known manner. Salting and filtration give a product that dyes animal fibers red shades much yellower and brighter than the dye of Example 4.

The formula of the dyestuff obtained is:

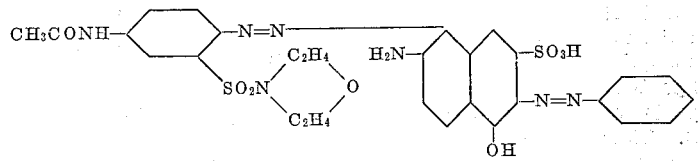

EXAMPLE 6

A diazo solution prepared from 287 parts of 4-nitroaniline-2-sulfonmorpholide as in Example 1 is added to an iced alkaline solution of 270 parts of the anilide of 2-hydroxy-3-naphthoic acid in 16,000 parts water along with sufficient sodium hydroxide as solution to neutralize the acid of the diazo solution. The color separates as a bright red precipitate which may be filtered off, dried and ground to a bright red powder. The same dyestuff may be produced also on the fiber padded with the anilide of 2-hydroxy-3-naphthoic acid.

The formula of the dyestuff obtained is:

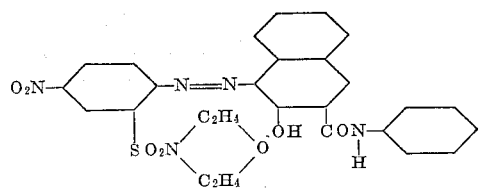

EXAMPLE 7

The diazo solution prepared from 287 parts of 4-nitroaniline-2-sulfonmorpholide as in Example 1 is added slowly to an iced slightly alkaline solution of 176 parts of 1-phenyl-3-methyl-5-pyrazolone in 6000 parts of water. Sufficient sodium hydroxide solution is added to permit completion of coupling in 10 to 15 minutes. About 4800 parts of a 20% sodium hydroxide solution are required. The coupling mixture at completion is still acid to Congo Red paper. The dye separates at once as a bright yellow precipitate which may be filtered off, dried and ground to yield a bright orange yellow powder insoluble in water.

The formula of the dyestuff obtained is:

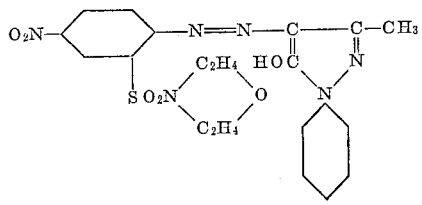

EXAMPLE 8

If the 1-phenyl-3-methyl-5-pyrazolone of the preceding example is substituted by 1-(2-chloro-5-sulfophenyl)-3-methyl-5-pyrazolone, a bright yellow water-soluble dye is produced which can be further treated with sodium sulfide solution to yield the corresponding amino dye which in turn by acetylation produces a dye of greener yellow shades of good brightness and showing no sensitivity to alkali.

The formula of the dyestuff obtained is:

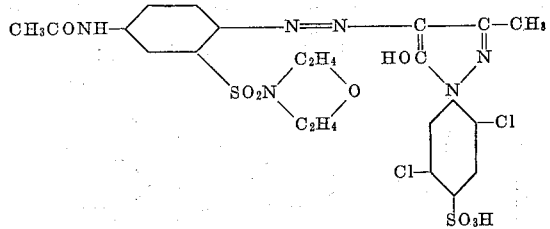

EXAMPLE 9

The diazo solution prepared from 287 parts of 4-nitroaniline-2-sulfonmorpholide as in Example 1 is added to a solution of 107 parts of m-toluidine in 4000 parts water and 37 parts HCl (100%) iced to 0° C. After stirring 20 minutes, the acidity is reduced by the addition of 2000 parts of sodium acetate crystals. Coupling is then finished in 20-40 minutes. After stirring two hours longer, the product is filtered and dried to yield 440 parts of a brick red powder, which is soluble in acetone as a red-orange solution, and dyes cellulose acetate fibers a salmon shade when dyed in the usual manner. The product is a useful intermediate for direct dyes of a variety of shades. Reduction of the nitro group of this product either before or after diazotization produces other valuable products.

The formula of the dyestuff obtained is:

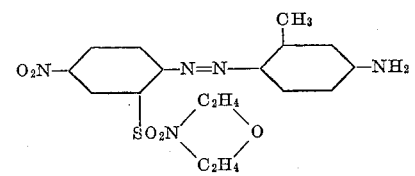

EXAMPLE 10

In the preceding example, the 107 parts of m-toluidine are substituted by 137 parts of cresidine. Coupling is complete in this case without addition of sodium acetate or other neutralizing agent. Filtration and drying yield a dark red powder which is soluble in acetone as blue-red solution and dyes cellulose acetate fibers blue shades of pink when dyed in the usual manner. This product is a useful intermediate for direct dyes of a variety of shades. Reduction of the nitro group of this product either before or after diazotization produces other valuable products.

The formula of the dyestuff obtained is:

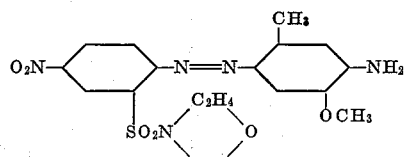

EXAMPLE 11

The amino dye of Example 1 (571 parts of 100%) is dissolved in about 14,000 parts of water at a temperature suitable for complete solution (slightly alkaline), 69 parts of 100% sodium nitrite is added, and when solution is complete, the dye solution is run into a mixture of 144 parts of 100% HCl and sufficient ice so that the final temperature is 0°–5° C. After stirring 15 minutes, the diazo solution is run into a solution of 230 parts of 1-naphthol-4-sulfonic acid and 318 parts of Na₂CO₃ in 2000 parts of water iced to 0° C. After stirring 2 hours, the product is salted, filtered and dried to give a dark powder which dyes vegetable fibers a bright green blue shade and animal fibers redder shades of blue.

The formula of the dyestuff obtained is:

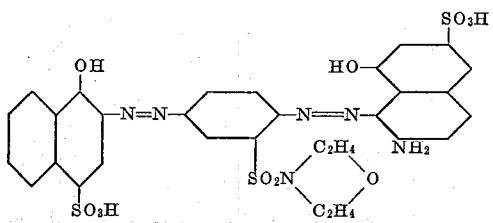

What we claim is:

1. An azo dyestuff having the following general formula:

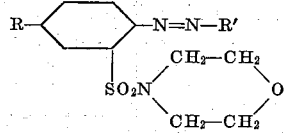

in which R is a member of the group consisting of nitro, amino, and acylamino radicals and R′ is an aromatic coupling component.

2. An azo dyestuff having the following general formula:

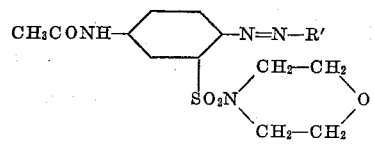

in which R′ is a radical of the naphthalene series containing a sulfonic acid group.

3. An azo dyestuff having the following formula:

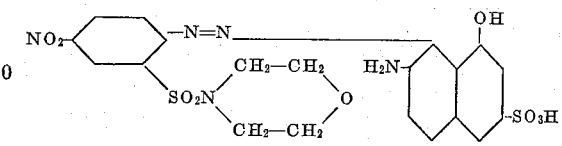

4. An azo dyestuff having the following formula:

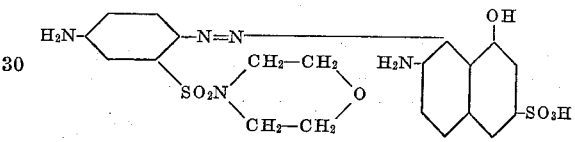

5. An azo dyestuff having the following formula:

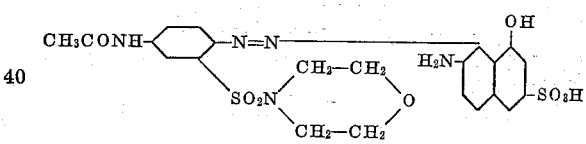

BYRON L. WEST.
DALE R. EBERHART.